(12) United States Patent
Dernier

(10) Patent No.: US 10,083,810 B2
(45) Date of Patent: Sep. 25, 2018

(54) OPERATION STOPPING SWITCH FOR AN ELECTRONIC DEVICE

(71) Applicant: THOMSON LICENSING, Issy les Moulineaux (FR)

(72) Inventor: William Philip Dernier, Marion, IN (US)

(73) Assignee: INTERDIGITAL CE PATENT HOLDING, Paris (FR)

( * ) Notice: Subject to any disclaimer, the term of this patent is extended or adjusted under 35 U.S.C. 154(b) by 0 days.

(21) Appl. No.: 15/514,503

(22) PCT Filed: Jun. 26, 2015

(86) PCT No.: PCT/US2015/037856
§ 371 (c)(1),
(2) Date: Mar. 25, 2017

(87) PCT Pub. No.: WO2016/048427
PCT Pub. Date: Mar. 31, 2016

(65) Prior Publication Data
US 2017/0271105 A1    Sep. 21, 2017

Related U.S. Application Data

(60) Provisional application No. 62/055,200, filed on Sep. 25, 2014.

(51) Int. Cl.
| H01H 3/16 | (2006.01) |
| H01H 3/18 | (2006.01) |
| H01H 15/14 | (2006.01) |
| H01H 17/12 | (2006.01) |
| H01H 19/18 | (2006.01) |
| H01H 21/28 | (2006.01) |

(Continued)

(52) U.S. Cl.
CPC .......... *H01H 21/282* (2013.01); *H01H 9/226* (2013.01); *H04N 5/64* (2013.01)

(58) Field of Classification Search
CPC ........ H01H 3/161; H01H 3/162; H01H 3/163; H01H 2003/00; H01H 2003/02; H01H 2009/02; H01H 2009/20; H01H 2071/10; H01H 2223/00; H01H 2223/044; H01H 21/282; H01H 9/226; H01H 2003/161; H01H 27/002; H04N 5/64; F16P 3/08; H05B 6/76
USPC ......... 200/50.32, 43.01, 43.05, 43.06, 43.08, 200/43.11, 43.14, 43.15, 43.16, 43.19, 200/43.21, 43.22, 47
See application file for complete search history.

(56) References Cited

U.S. PATENT DOCUMENTS

| 2,344,636 A | 3/1944 | Quasi |
| 3,005,065 A | 10/1961 | Jellies |

(Continued)

FOREIGN PATENT DOCUMENTS

EP    2256770    12/2010

*Primary Examiner* — Anthony R. Jimenez
(74) *Attorney, Agent, or Firm* — Jeffrey M. Navon

(57) ABSTRACT

An electronic device is provided that includes an electronic component within the electronic device, a kill switch; an access door providing access to the electronic component and the kill switch and a latch for securing access to the electronic component in a closed position and for giving access to the electronic component in an open position. The latch activates the kill switch in the open position, independently of a position of the access door.

8 Claims, 11 Drawing Sheets

(51) Int. Cl.
*H01H 9/22* (2006.01)
*H04N 5/64* (2006.01)

(56) References Cited

U.S. PATENT DOCUMENTS

| | | | |
|---|---|---|---|
| 5,193,667 | A | 3/1993 | Choi |
| 6,353,195 | B1 | 3/2002 | Stanfield |
| 6,632,108 | B1 | 10/2003 | Hohlfelder |
| 6,634,898 | B2 | 10/2003 | Clements |
| 6,985,358 | B2 | 1/2006 | Thompson et al. |
| 7,551,428 | B2 | 6/2009 | Homer et al. |
| 8,824,884 | B1 | 9/2014 | Trujillo |
| 2005/0152104 | A1 | 7/2005 | Kaply et al. |
| 2005/0285411 | A1 | 12/2005 | Aartsen |
| 2011/0199720 | A1* | 8/2011 | Kajiyama ............ B65D 53/00 361/679.01 |
| 2012/0243176 | A1 | 9/2012 | Ritter et al. |
| 2013/0192962 | A1 | 8/2013 | Engesser et al. |
| 2013/0340025 | A1 | 12/2013 | Dernier |

* cited by examiner

OPERATION STOPPING SWITCH FOR AN ELECTRONIC DEVICE

CROSS-REFERENCE TO RELATED APPLICATIONS

This application claims the benefit, under 35 U.S.C. § 365 of International Application PCT/US2015/037856, filed Jun. 26, 2015, which was published in accordance with PCT Article 21(2) on 31 Mar. 2016, in English, and which claims the benefit of U.S. Provisional Patent Application No. 62/055,200, filed 25 Sep. 2014.

FIELD

The present principles relate to an electronic apparatus and an associated top section design incorporating a latch and kill switch.

BACKGROUND

Electronic apparatuses or devices such as set-top boxes are typically assembled apparatuses having a plurality of walls and a top surface that is generally designed to encase and protect interior components. Most designs of these electronic apparatuses are such that the top plan view shape is rectangular and the apparatuses are horizontal electronic apparatuses in which the height of the apparatuses is smaller than the horizontal widths of the front wall, rear wall, and the sides walls. Such horizontal devices are mechanically stable given their wide bases and their top sections being planar horizontal structures.

Given that horizontal devices are mechanically stable with flat tops, it is appropriate to have access doors and/or slots, jacks or ports positioned on vertical sidewalls. The reason is there is little risk of the devices falling over when access doors and/or slots, jacks or ports on vertical sidewalls are accessed.

New vertical electronic apparatuses are now being contemplated for the consumer market in which the height of the apparatuses is larger than the horizontal widths of at least one of the walls. FIG. 1 shows a perspective view of a considered vertically oriented electronic device 200 having a flat top 210, a front wall or front surface 208, a rear wall 206, side walls 204, and a base 205.

Unfortunately, such vertical devices have the potential to have high centers of mass and can tip and fall if access doors and/or slots, jacks or ports are positioned on the vertical walls.

Furthermore, the placement of access doors and/or slots, jacks or ports and the functionalities associated therewith on the vertical walls can interfere with heat management systems for such devices.

As such, a need exists for a vertical electronic device design that avoids interfering with heat management systems and does not place the device in jeopardy of falling.

Further, a need exists for a safe and fast method of stopping operation of a vertical electronic device by a customer or user to replace a key component or components such as hard drives, smart cards, information cards, disks or information chips.

Further, it has been recognized that mechanisms involving the automatic activation of a kill switch triggered by the opening of an access door can lead to failures and can be frustrating to a user who may want the device to be operative with the access door open. Additionally, such automatic activation of the kill switch in response to an access door being open can cause the device to not power up if the access door or the mechanism associated with the access door is missing or broken.

In sum, a need exists for a vertical electronic device design in which the unit will function without a door, with a broken door, and/or with an open door and will still provide a user with the ability to voluntarily keep the components or device powered and the ability to voluntarily power down components or the device if parts are present and functioning.

SUMMARY

An electronic device 300 is disclosed that has a top 310 having an access door 314, a component 341 laterally under the access door, a latch 340 laterally under the top and the door and at least partially laterally over the component, and a kill switch or tact switch, also referred to as a tactile switch, for powering down the component and/or the electronic device. The latch can have a closed physical position in which the latch blocks access to and/or blocks removal to the component and permits the electronic device and/or the component to function even when the door is open. The latch can have an open physical position in which the latch is cleared from or moved away from the component to permit access and/or reversible removal to the component and in this open physical position the latch causes the actuation of the kill or tact switch to power down the component and/or the electronic device. The access door when open can permit access to the latch, but does not power down the device and/or the component.

The principles can include a vertically oriented electronic device 300 comprising: a top 310; a vertical front wall 308; a vertical rear wall 306; vertical side walls 304; an electronic component 341 within the vertically oriented electronic device; a kill switch 349 within the vertically oriented electronic device; and an access door 314 that is part of the top, the access door providing access to the electronic component and the kill switch. The vertically oriented electronic device further can include a latch 340 for securing the electronic component and activating the kill switch in which the latch is positioned between the electronic component and the access door when the access door is closed. The latch can include a first end 342 for blocking access to the electronic component when the latch is in a closed position and for providing an access way to the electronic component when the latch is in an open position. The latch can further include a second end 343 opposing the first end such that the first and second ends pivot about a pivot point 344 in which the second end activating the kill switch when the latch is rotated about the pivot point to the open position. A part of the kill switch can be positioned at a vertical position that is higher than the electronic component and the kill switch is laterally offset from the electronic component in which the latch comprises a second end 343 opposing the first end such that the first and second ends pivot about a pivot point 344 and the second end contacting the kill switch when the latch is rotated about the pivot point to the open position, thereby activating the kill switch. The second end can be shorter than the first end in a direction parallel to a long axis of the first end of the latch, the second end can be shorter than the first end in a direction parallel to a long axis of the first end of the latch, the latch can have an L-shape made by an extension of the second end that is orthogonal to the long axis of the first end, and/or second end can have a distal end that contacts the kill switch to activate the kill switch. When in the closed position, the long axis of the first end can be parallel with the lateral direction of the vertical rear wall and the first end can be laterally positioned over the electronic component and when in the open position, the long axis of the first end can be perpendicular to the lateral direction of the vertical rear wall and the first end can be laterally offset from the electronic component. The vertically oriented electronic device can have an exterior surface such that the top is convex and an interior surface of the top is concave. From a top plan view perspective, angles between exterior surfaces of the side vertical walls and the vertical rear wall can be acute. The access door can have an exterior surface that is curved and integrated with the exterior surface of the top. The curvature of the top and interior curvature of the top provides additional interior volume for the vertically oriented electronic device to fit the latch and kill switch. The vertically oriented electronic device can be a set top box or a gateway device. The vertically oriented electronic device can further include vents 320 positioned over a majority of plan view surface areas of the side walls.

The principles can be directed to a set top box 300 that comprises: a top 310; an electronic component 341 within the vertically oriented electronic device; a kill switch 349 within the set top box; an access door 314 that is part of the top in which the access door provides access to the electronic component and the kill switch; and a latch 340 for securing the electronic component and activating the kill switch, wherein the latch is positioned between the electronic component and the access door when the access door is closed.

The principles can be directed to a gateway device 300 that comprises: a top 310; an electronic component 341 within the vertically oriented electronic device; a kill switch 349 within the gateway; an access door 314 that is part of the top in which the access door provides access to the electronic component and the kill switch; and a latch 340 for securing the electronic component and activating the kill switch, wherein the latch is positioned between the electronic component and the access door when the access door is closed.

BRIEF DESCRIPTION OF THE DRAWINGS

The principles will be explained in greater detail in the following with reference to embodiments, referring to the appended drawings, in which.

DESCRIPTION OF EMBODIMENTS

Figure 1:
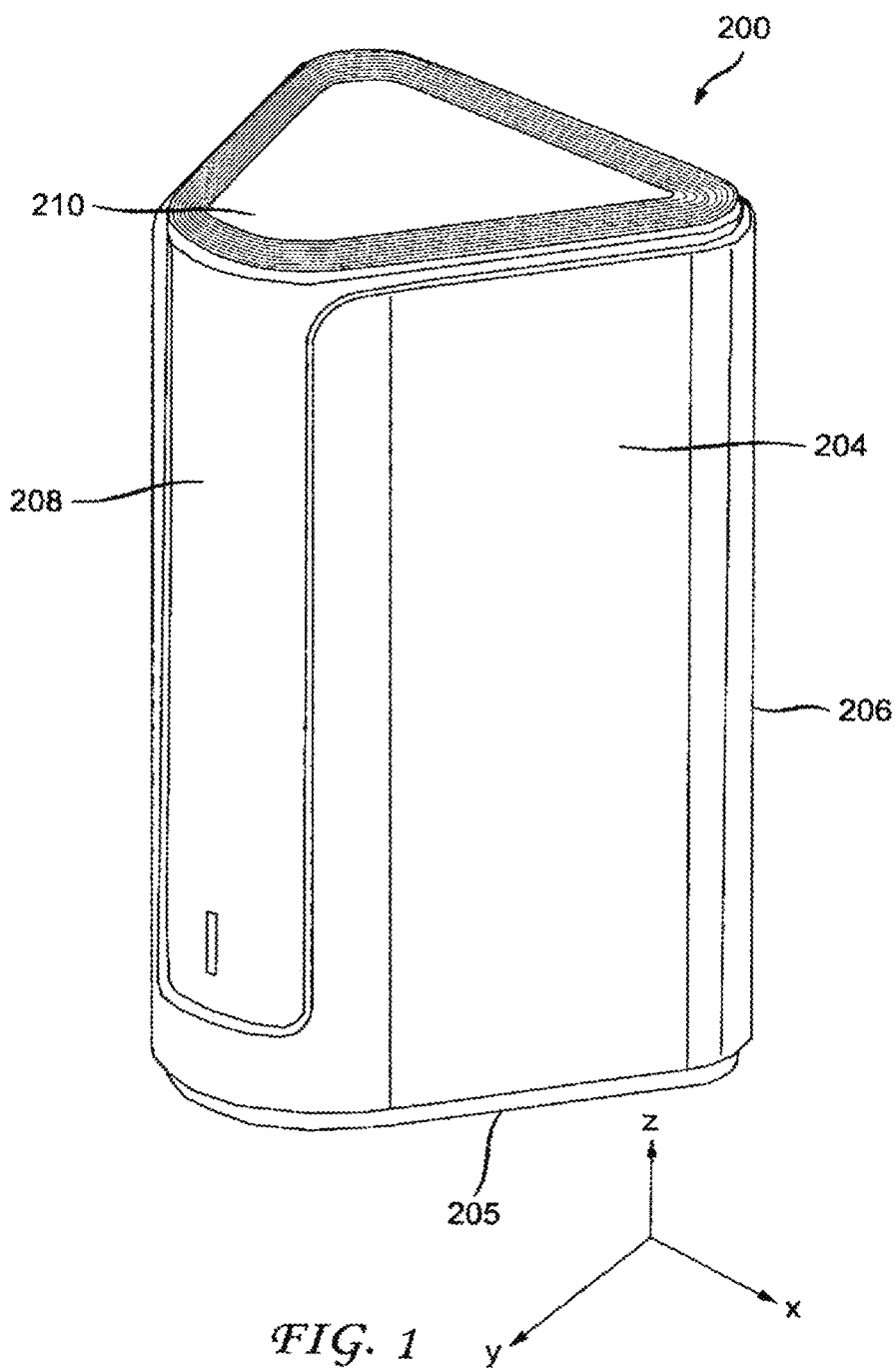
FIG. 1 is a perspective view of the vertically oriented electronic device 200 considered for the consumer market.
Figure 2:
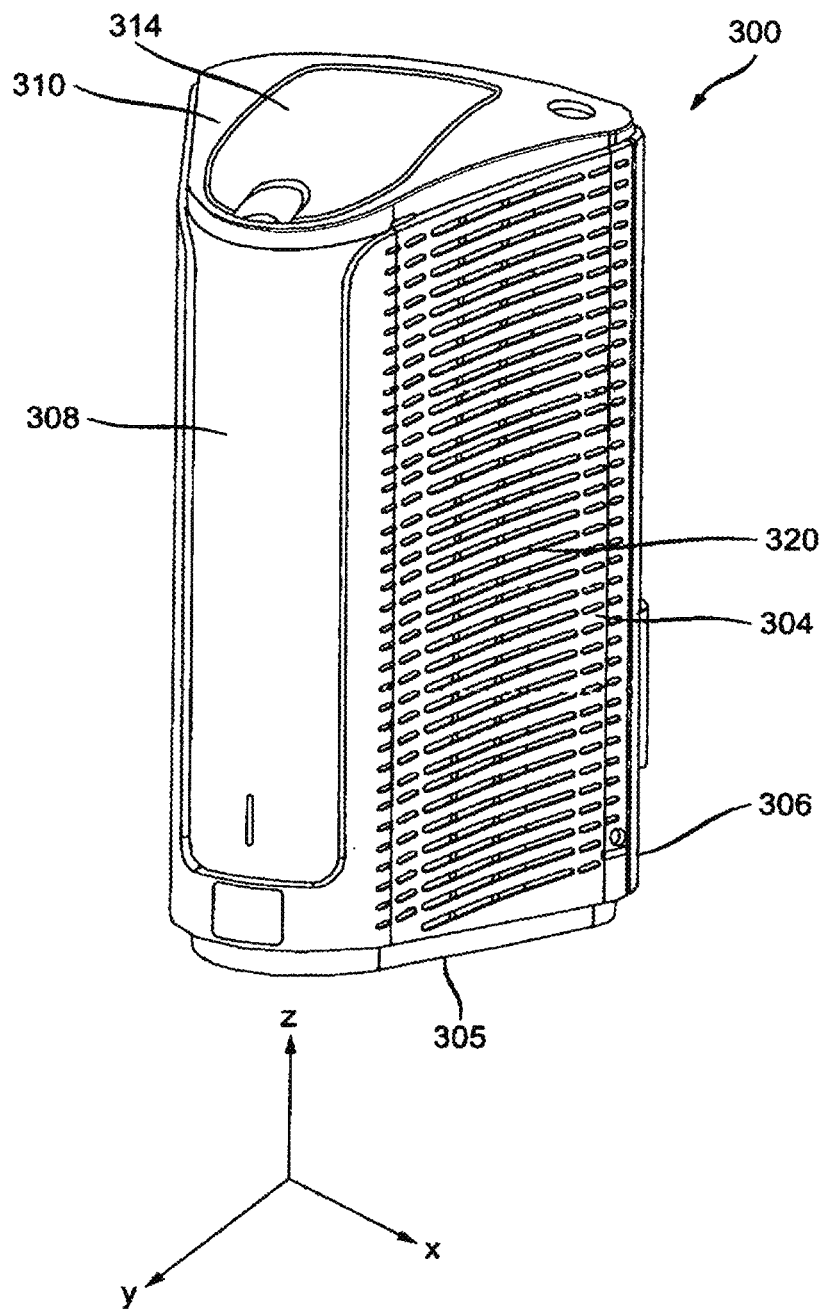
FIG. 2 is a perspective view of the vertically oriented electronic device 300 according to the current principles.

FIG. 2 is a perspective view of the vertically oriented electronic device 300 according to the current principles. The device 300 has a front wall or front surface 308, a rear wall 306, side walls 304, a base 305, and a top 310 which can be curved and/or tilted downward from rear wall 306 toward the front wall 308. FIG. 2 further shows that the vertically oriented electronic device 300 can have an access door 314 being positioned in or on the top 310 and can have vents 320 positioned in at least one of the side walls 304.

With the access door 314 positioned on the top 310 and the vents 320 positioned on the side walls 304, the access door can provide access to an interior component 341. The access door 314 by being positioned on the top 310 can assist with the goal of the access door 314 and an associated interior component not interfering with the thermal management system, because, at the very least, such a construction permits the vertical walls to have many vents 320 for heat removal and/or for cooling air entry. The access door 314 by being positioned on the top 310 can assist with the goal of reducing the risk of tilting the device 300 when accessing interior components by ensuring that the more significant forces applied to the device, which are generally the removal and insertion forces applied to an interior component, are applied vertically and not applied horizontally. In other words, the application of significant vertical forces will be much less likely to cause the device 300 to tilt than significant horizontal forces that could be necessary if the access doors were placed on the side wall 304.

The access door 314 can essentially be a cover for an internal component, for a slot or bay for an internal component, for a jack or jacks, for a port, for a smart card/smart card holder, for an information card/information card holder, a disk, information chips, and/or for a circuit board.

Figure 3:
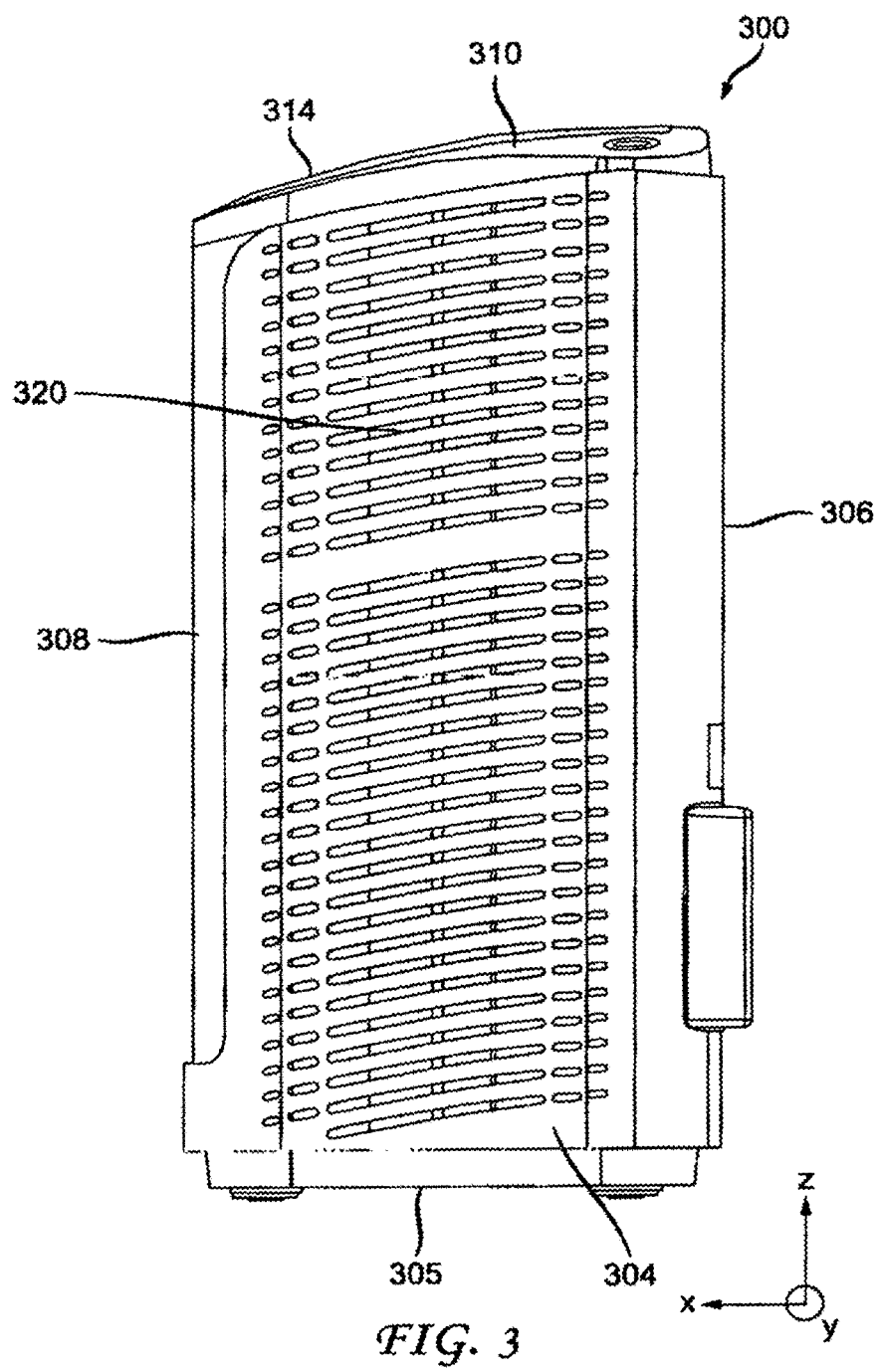
FIG. 3 is a side plan view of the vertically oriented electronic device 300 according to the current principles.

FIG. 3 is a side plan view of the vertically oriented electronic device 300 according to the current principles. This view provides a better perspective for how the top 310 can be curved and how the curvature of the door 314 can be integrated with the general curvature of the top 310. Essentially, the exterior surface of the top 310 can be convex and have a spherical shape, wherein the exterior top surface can be angled such that all of the exterior top surface or most the exterior top surface, i.e. 75% or greater, is tilted or angled downward toward the front surface 308. The exterior top surface of the top 310 can also be convex and have a circular shape along vertical planes parallel to the major x-axis and/or along vertical planes parallel to the minor y-axis, wherein the exterior top surface can be angled such that all of the exterior top surface or most of the exterior top surface, i.e. 75% or greater, is tilted or angled downward toward the front surface 308. The exterior top surface of the top 310 can also be convex and curved along vertical planes parallel to the major x-axis and/or along vertical planes parallel to the minor y-axis, wherein the exterior top surface can be angled such that all of the exterior top surface or most of the exterior top surface, i.e. 75% or greater, is tilted or angled downward toward the front surface 308.

It should be noted that the vertically oriented electronic device 300 in FIG. 3 by having the door 314 and associated component located at the top 310 and arranged centrally at the top 310 provides the opportunity for the series of vents 320 on the side walls 304 to be deployed throughout the side wall 304 to assist with the heat management system of the device, because otherwise surface area of the vertical walls such as side walls 304 would have to be dedicated to an access door.

Figure 4:
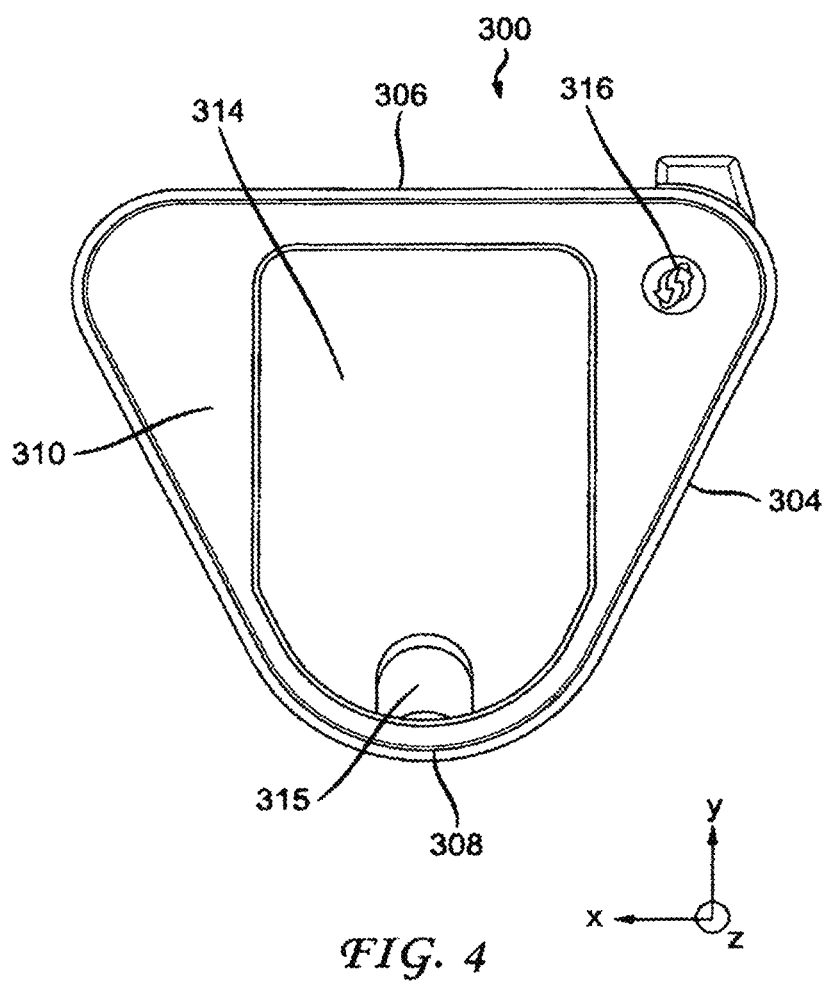
FIG. 4 is a top plan view of the vertically oriented electronic device 300 with an access door 314 closed according to the current principles.

FIG. 4 is a top plan view of the vertically oriented electronic device 300 in which an access door 314 and a power button 316 are shown. This view shows that the access door can have a thumb access slot 315 positioned toward the vertical front surface 308, which can permit the user to open the access door 314. The hinge 350 for the door 314 can be positioned near vertical rear wall 306. Here, the access door 314 is closed.

The power button 316 can be both a signal indicator and/or a power switch. As a signal indicator, the button 316 can signal that the device is on or off or even in standby mode by way providing different colors, different intensities of colors, no color or no lighting vs. color or lighting, different symbols, different alphanumeric signatures, or different button orientations and/or heights commensurate with the current operating condition of the device.

Figure 5A:
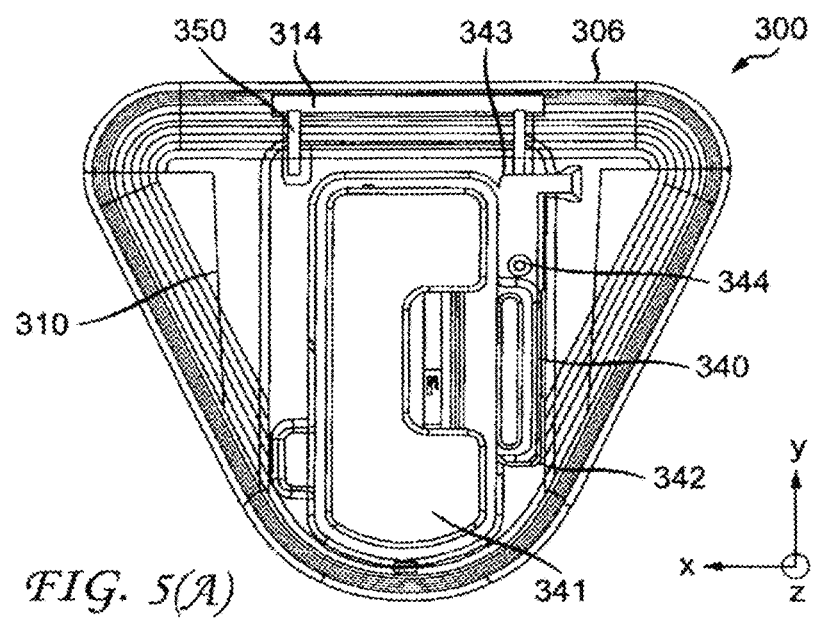
FIG. 5 shows top plan views of the vertically oriented electronic device 300 with the access door 314 open according to the current principles.

FIG. 5A shows a top plan view of the vertically oriented electronic device 300 with the access door 314 open and the latch 340 open or unengaged. In this view, the top of the entire latch 340 can be observed, because part of the top 310 is removed or omitted to enable this view of some of the key features; however, in some embodiments the top can be shaped to not cover some or all of the latch 340. The door 314 is open about its hinges 350 and the door is oriented in a vertical position. The latch 340 can be an elongated flat structure with some contour to permit gripping and the latch can generally be horizontally oriented. The latch can have a first end or latch end 342 and an opposing second end or kill or tact switch contact end 343 on either side of a pivot point 344. In this orientation, the component 341 which can be any number of components and/or functionalities such as a hard disk drive that can be accessed by a user, because (1) the latch 340 is oriented such that the latch or its second end 343 engages or causes the engagement with a kill or tact switch to shutdown the component 341 and/or the device 300 in general and (2) the latch 340 is oriented such that the latch or its first end 342 physically does not block an opening or access way to the component 341 by not extending over the opening or access way.

Figure 5B:
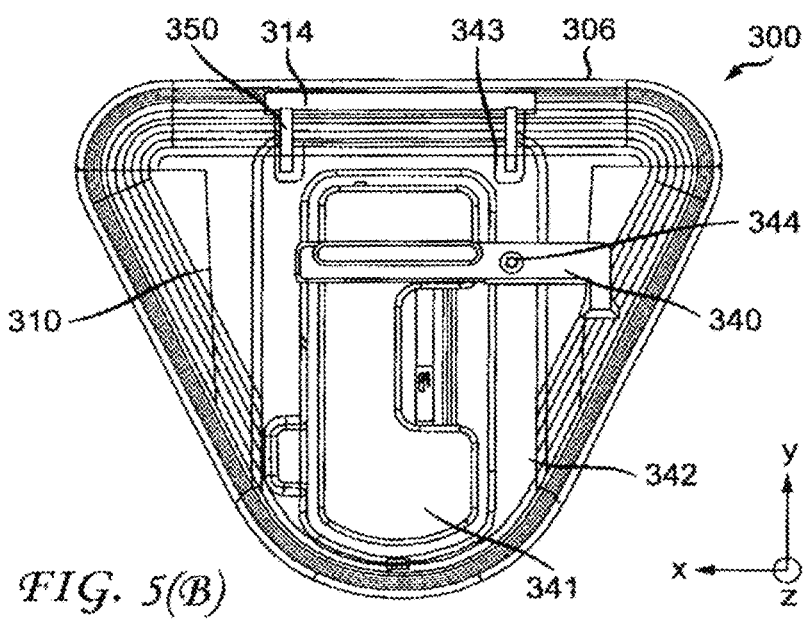

FIG. 5B shows a top plan view of the vertically oriented electronic device 300 with the access door 314 open and the latch 340 closed or engaged. In this view, the top of the entire latch 340 can be observed because part of the top 310 is removed or omitted to enable this view. In some embodiments, the top can be shaped to not cover some or all of the latch 340 in this orientation. In this orientation, the component 341 cannot be accessed by a user, because (1) the latch 340 is oriented such that the latch or its second end 343 does not engage nor cause the engagement with a kill or tact switch to shut down the component 341 and/or the device 300 in general and (2) the latch 340 is oriented such that the latch or its first end 342 physically blocks the opening or access way to the component 341 by extending over or across the opening or access way either partially or completely in at least one dimension, e.g. the minor y-axis dimension in this example.

Figure 6:
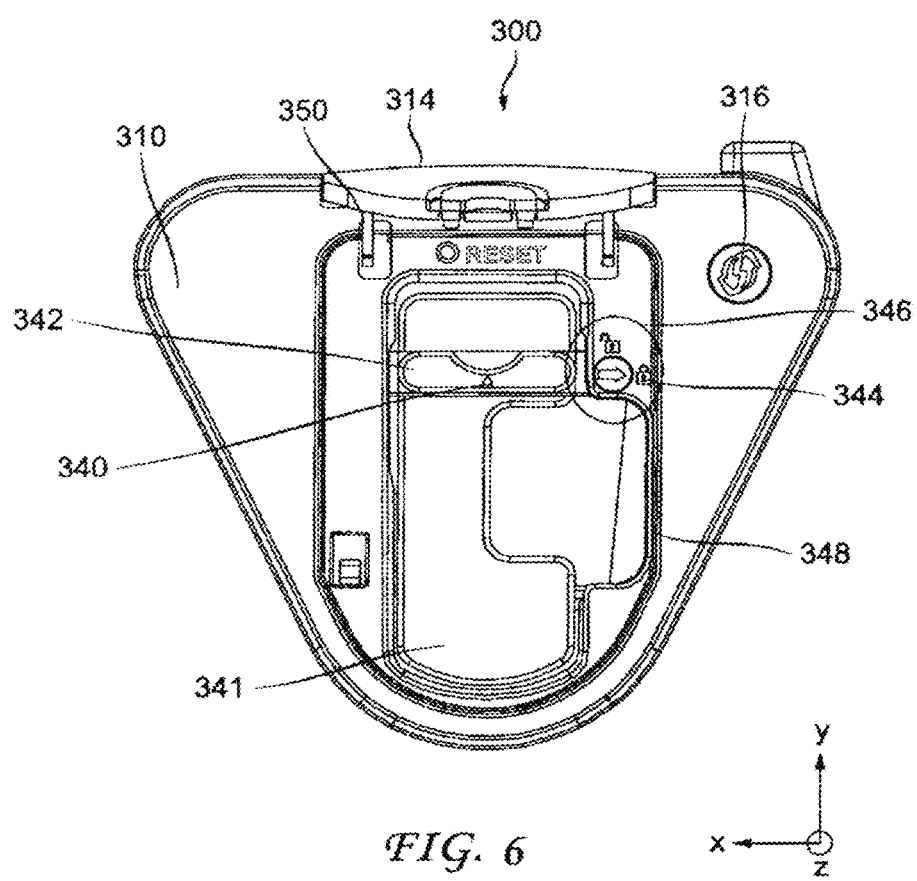
FIG. 6 is a top plan view of the vertically oriented electronic device 300 with the access door 314 open and the latch 340 engaged according to the current principles.

FIG. 6 is another top plan view of the vertically oriented electronic device 300 with the access door 314 open and the latch 340 engaged, wherein top 310 is included and covers part of the latch 340, i.e. the second end 343. Here, the latch 340 is engaged and the knob or retainer 346 by or at the pivot point 344 indicates a locked condition with a lock symbol and the kill or tact switch which can be in the vicinity of the button 316 under the top 310 is opened and the component 341 and/or the device 300 are powered and the component 341 is not removable. This view shows that the top 310 can have a cutout 348 that allows access to a user to freely move the latch 340 back and forth between the disengaged and engaged positions by having the first end 342 of the latch be in view and accessible in either position when the door 314 is open.

Figure 7:
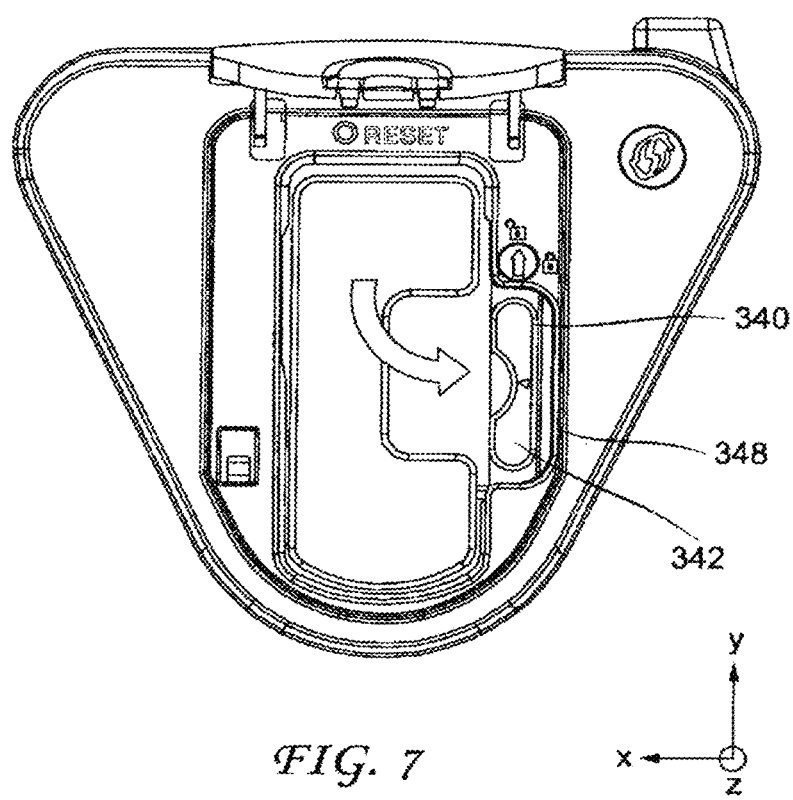
FIG. 7 is a top plan views of the vertically oriented electronic device 300 with the access door 314 open and the latch 340 disengaged according to the current principles.

FIG. 7 is similar to FIG. 6 except that the latch 340 disengaged. This view illustrates that the top 310 can have an opening with the cutout 348 that allows access to a user to freely move the latch 340 from the disengaged position to the engaged position when the door 314 is open, because the first end 342 of the latch is in view and accessible.

Figure 8:
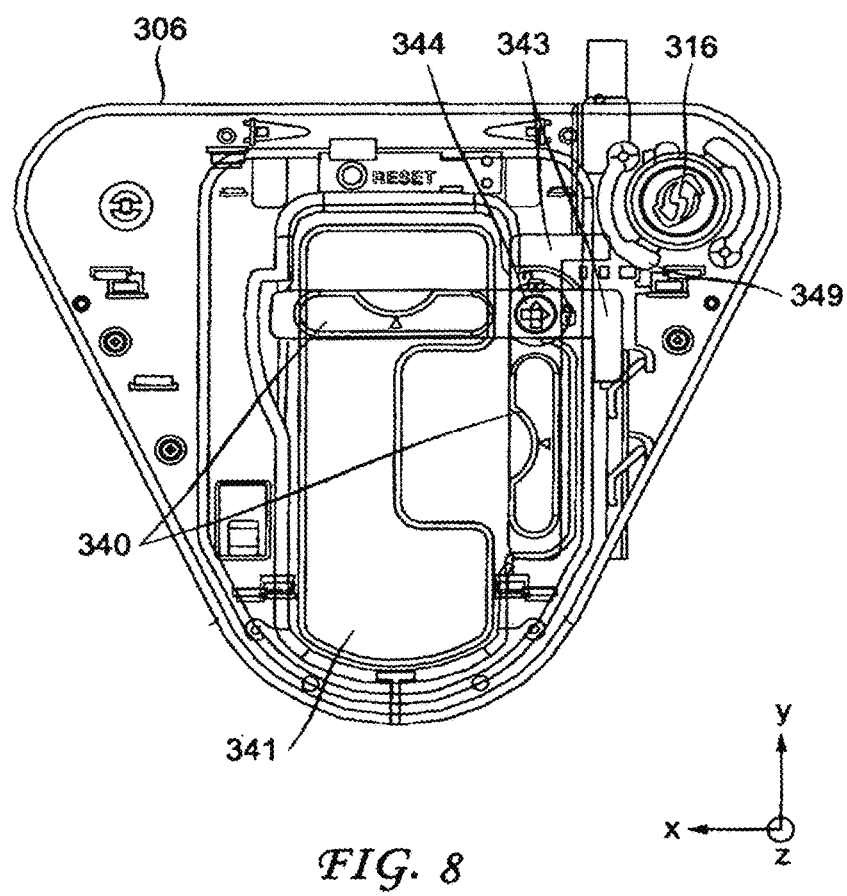
FIG. 8 is a top plan view of the vertically oriented electronic device 300 with the latch 340 shown in both positions according to the current principles.

FIG. 8 is a top plan view of the vertically oriented electronic device 300 with the access door 314 and part of the top removed or omitted. This view shows how the kill or tact switch 349 can be contacted by the second end 343 of the latch 340 when the latch is rotated about its pivot point 344. This view shows that the latch 340 can have an L-shape and the second end 343 can include an orthogonal extension that extends from a main elongated structure of the latch 340 and the distal end of the orthogonal extension contacts the latch 349 to power down the component 341 or the device 300. The orthogonal extension can be directed away from the component 341 in the open position and can be directed away from the rear wall 306 in the closed position.

Figure 9:
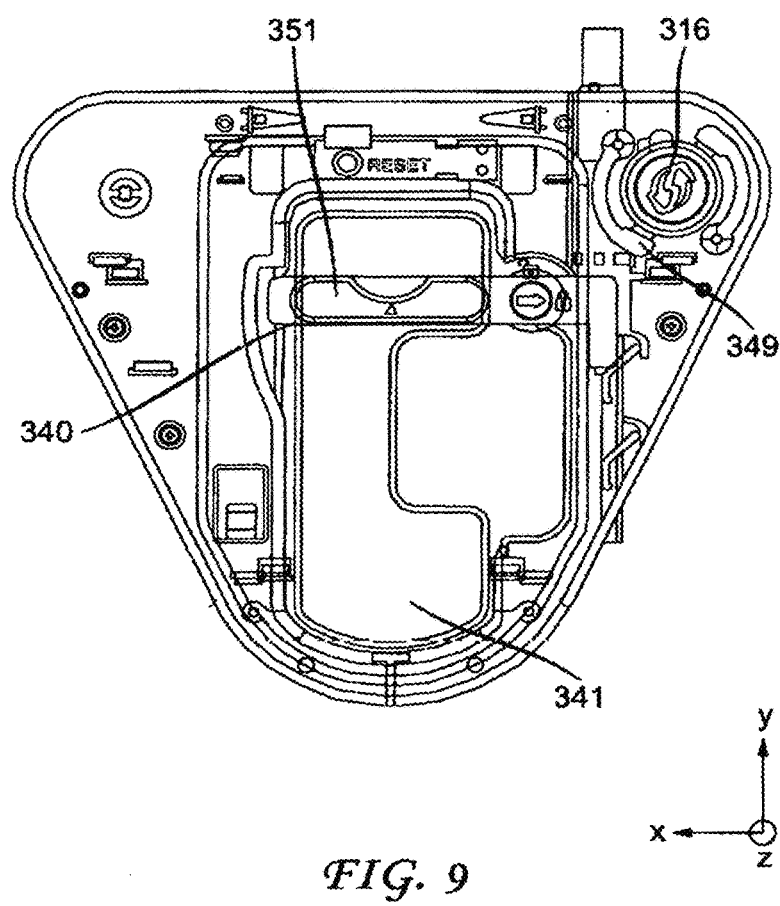
FIG. 9 is a top plan view of the vertically oriented electronic device 300 the latch 340 shown in the locked or engaged position according to the current principles.
Figure 10:
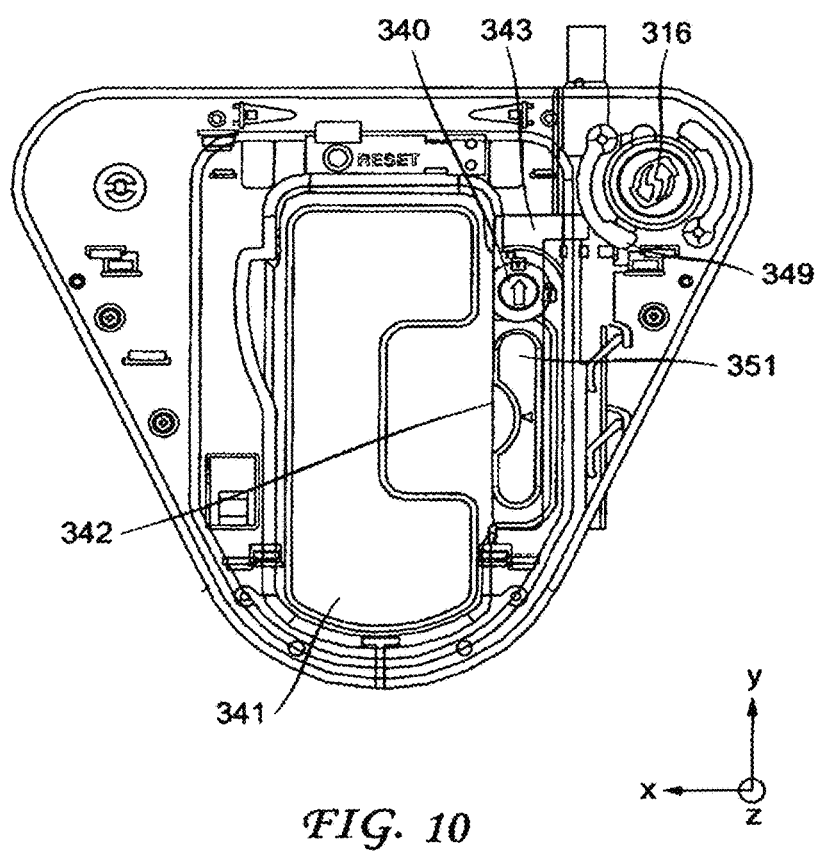
FIG. 10 is a top plan view of the vertically oriented electronic device 300 with the latch 340 shown in the opened or disengaged position according to the current principles.

FIGS. 9 and 10 are top plan views of the vertically oriented electronic device 300 that shows the latch 340 engaged and disengaged, respectively. These views show that the button 316 or power signal can be near or connected to the kill or tact switch 349. FIGS. 9 and 10 also highlight how the first end 342 of the latch can have a contoured top portion 351 that is raised with respect to a main top surface of the latch 340 to permit the user to easily grip the contoured top portion 351 to conveniently rotate the latch 340. FIGS. 9 and 10 also highlight that the first end 342 can be the gripping end of the latch 340 and can be longer than the second end 343. This can ease the amount of lateral force necessary to pivot the latch when the user grips the first end 342 to rotate the latch 340.

Figure 11:
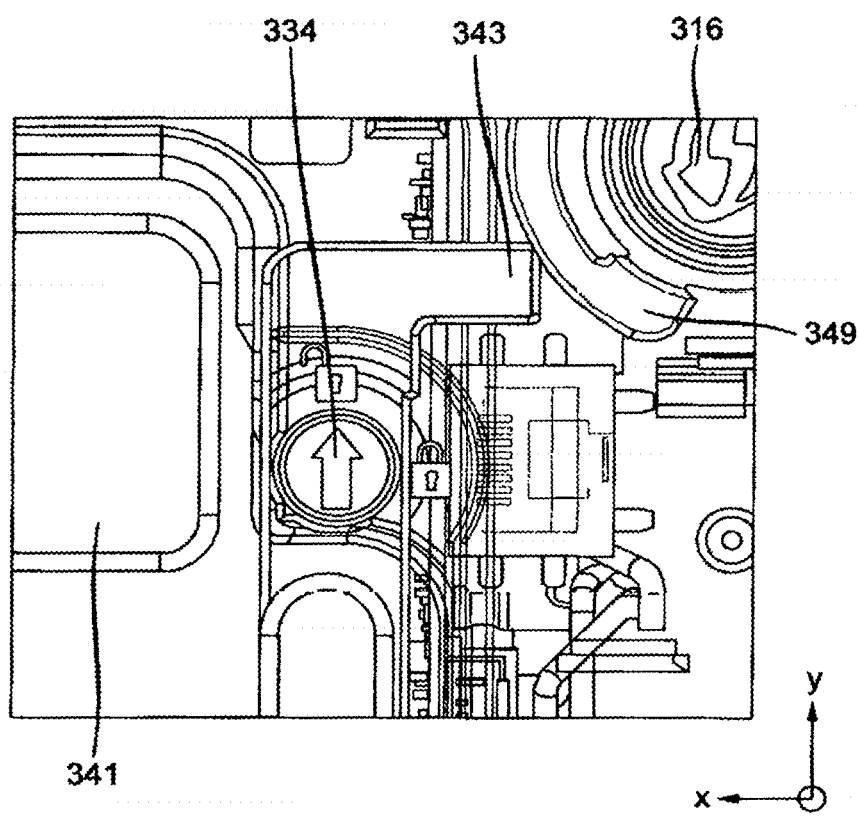
FIG. 11 is a magnified top plan view of the vertically oriented electronic device 300 showing the closing of a kill or tact switch 349 according to the current principles.

FIG. 11 is an enlarged top plan view of the vertically oriented electronic device 300 showing the closing of a kill or tact switch 349 according to the current principles.

Further embodiments can include the features described herein, but with the vertical electronic device being rectangular.

The features herein described provide a mechanisms involving the automatic activation of a kill switch triggered not by the opening of an access door but by the rotation of a latch underneath the access door 314, thereby allowing the user to inspect the component 341 in the device 300 in operation when the door is open and allowing the user to voluntarily power down the device or the component or its function by using the latch.

It should be noted that the top 310 can be a flat top or a curved top; however, embodiments in which the top 310 is curved provides a number of potential benefits. The curved top can provide some additional interior volume for the interior component 341 and the latch 340 and the associated parts discussed above and can also provide some additional interior volume the air circulation to assist in heat management. The curved top can also assist in reducing resistance to interior air flow by providing a smoother and more continuous surface at transition locations (e.g. intersection regions) such as where the interior side wall transitions to the interior top wall. The curved top surface, which is noticeably curved, will discourage people from placing objects thereon, thereby reducing the risk that objects placed on the top surface can result in damage to top access ways, can interfere with a heat management system, can cause tilting and falling of objects thereon and/or the vertical electronic device, can cause scratches to the top surface, and can cause risk of fluid entry from liquid filled vessels.

Although the illustrative embodiments have been described herein with reference to the accompanying drawings, it is to be understood that the present principles are not limited to those precise embodiments, and that various changes and modifications can be effected therein by one of ordinary skill in the pertinent art without departing from the scope of the present principles. All such changes and modifications are intended to be included within the scope of the present principles as set forth in the appended claims.

Also, it is intended that expressions such as "back" and "front" and "vertical" and "horizontal," as well as other complementary terms are intended to be construed from the perspective of the observer of the figures; and as such, these expression can be interchanged depending upon the direction from which the observer looks at the device.

The invention claimed is:

1. An electronic device comprising:
    an electronic component within the electronic device;
    a kill switch within the electronic device for powering down at least the electronic component within the electronic device;
    a latch for securing the electronic component and for activating the kill switch;
    an access door in an encasing of the electronic device, the access door providing access to the electronic component and the latch;
    wherein the latch comprises
    a first end for blocking access to the electronic component when the latch is in a closed position and for providing an access way to the electronic component when the latch is in an open position,
    a second end opposing the first end such that the first and second ends pivot about a pivot point, the second end activating the kill switch when the latch is rotated about the pivot point to the open position to permit access to the electronic component, the latch position being independent of the position of the access door such that the access door when open permits access to the latch while opening the access door does not activate the kill switch.

2. The electronic device of claim 1, wherein the kill switch is further configured to power down the electronic device.

3. The electronic device of claim 1, wherein the electronic device further comprises a power button connected to the kill switch.

4. The electronic device of claim 1, wherein a part of the kill switch is positioned at a position that is higher than the electronic component and the kill switch is laterally offset from the electronic component.

5. The electronic device of claim 1, wherein the electronic device is a set top box.

6. The electronic device of claim 1, wherein the electronic device is a gateway device.

7. The electronic device of claim 1, wherein the second end is shorter than the first end in a direction parallel to a long axis of the first end of the latch.

8. The electronic device of claim 7, wherein:
    the latch has an L-shape made by an extension of the second end that is orthogonal to the long axis of the first end; and
    a distal end of the extension of the second end contacts the kill switch to activate the kill switch when the latch is in the open position.

* * * * *